Feb. 17, 1931.  L. W. EGGLESTON ET AL  1,793,226
MOTOR OPERATED DEVICE
Filed April 2, 1926   2 Sheets-Sheet 1

INVENTORS
Lewis W. Eggleston
BY Earnest J. Dillman their ATTORNEY.

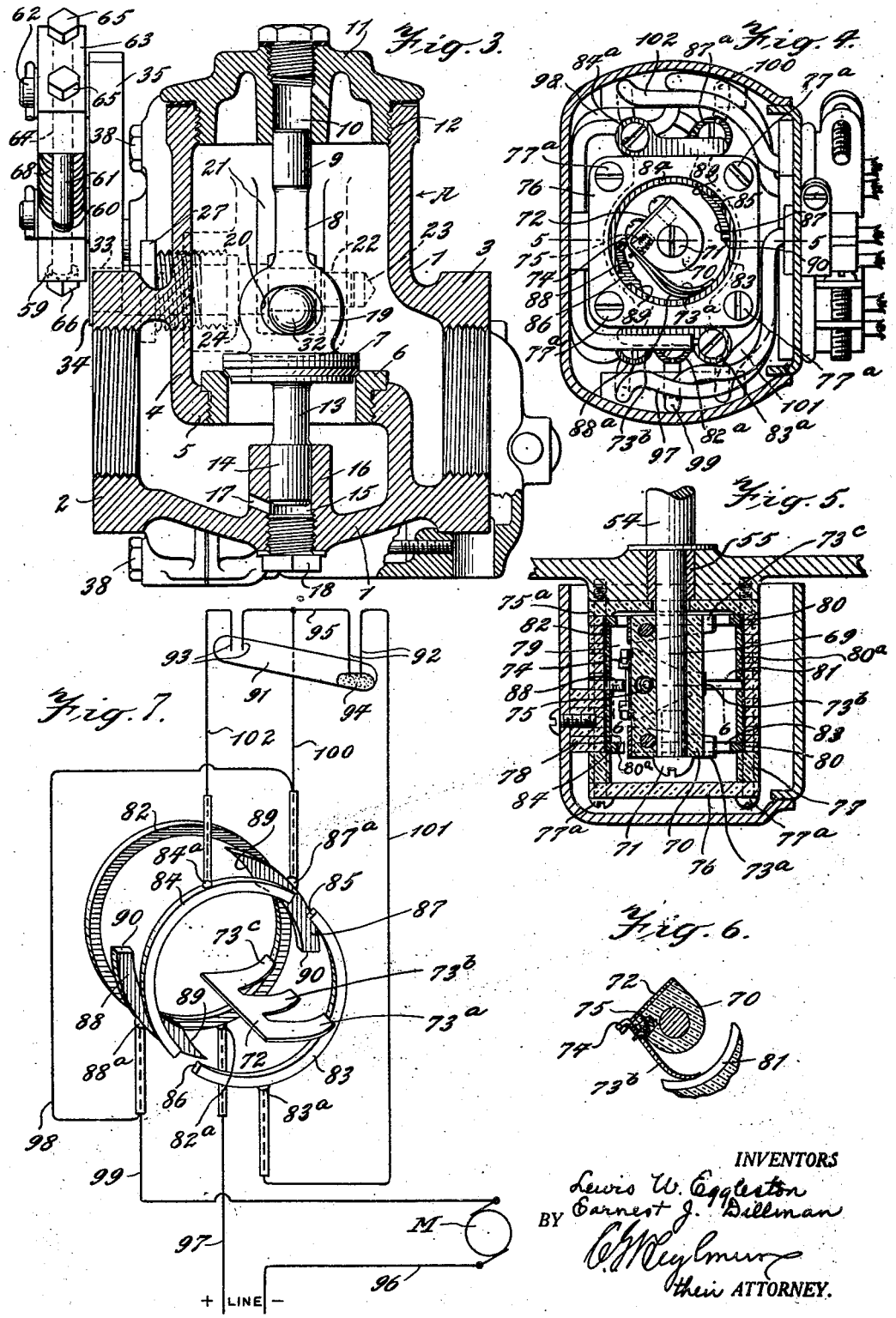

Patented Feb. 17, 1931

1,793,226

UNITED STATES PATENT OFFICE

LEWIS W. EGGLESTON, OF CLARENCE TOWNSHIP, ERIE COUNTY, AND EARNEST J. DILLMAN, OF KENMORE, NEW YORK, ASSIGNORS TO AMERICAN RADIATOR COMPANY, OF NEW YORK, N. Y., A CORPORATION OF NEW JERSEY

MOTOR-OPERATED DEVICE

Application filed April 2, 1926. Serial No. 99,208.

Our invention relates to new and useful improvements in motor operated devices, and particularly contemplates provision of an electrically operated motor means for actuating a part or mechanism, for example, a valve, to move the same from and toward a certain position—in the case of a valve, to move the same from closed to open position, or vice-versa, relative to a port or valve seat.

The object of the invention is to provide a device of the character stated, which will be simple in construction, certain, efficient and positive in operation, will be unlikely to get out of order, and will be easy to install and control.

The invention consists in the improved construction of parts and elements, and their aggroupment in operative combination, to be more fully described hereinafter, and the novelty of which will be particularly pointed out and distinctly claimed.

In the accompanying drawings to be taken as a part of these specifications, we have shown a preferred embodiment of our invention, and in which—

Fig. 3 is a section on the line 3—3 of Fig. 2, looking in the direction of the arrows applied to such section line;

Fig. 4 is a view in elevation of a switch or circuit-controlling device for controlling the flow of electric current to the motor, looking at the same from the rear of Figs. 1 and 2;

Fig. 5 is a section on the line 5—5 of Fig. 4;

Fig. 6 is a detail sectional view on the line 6—6 of Fig. 5, and

Fig. 7 is a diagrammatic view of the circuit leads and contacts associated with the circuit-controlling device shown in Figs. 4 and 5.

Figure 1:
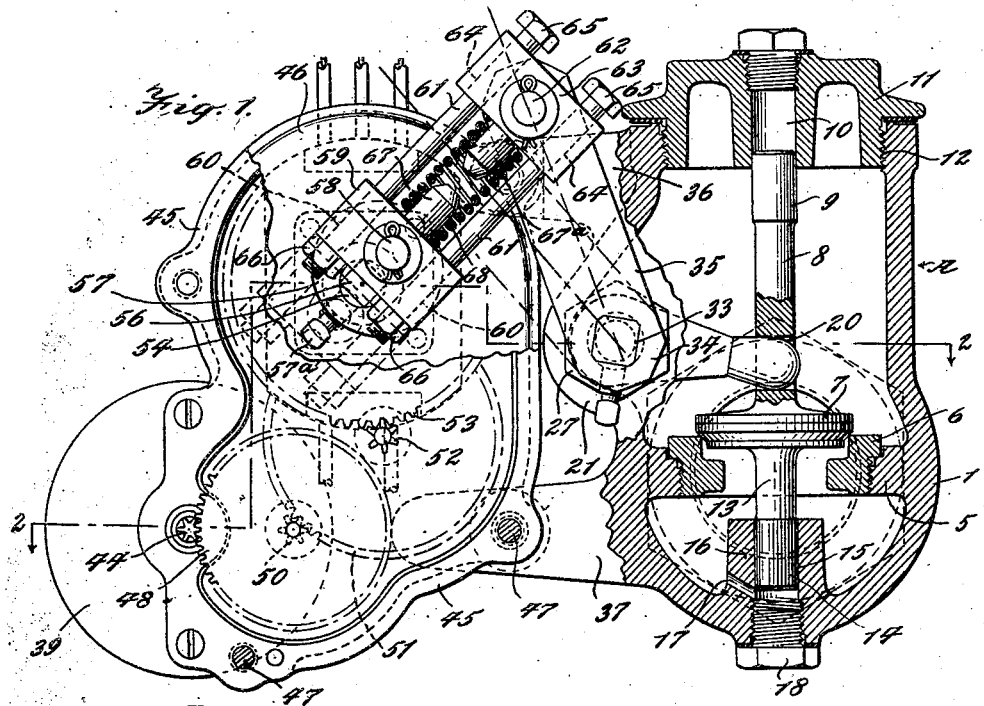
Figure 1 is a view in side elevation, partly in central longitudinal section, of an embodiment of our invention applied for the operation of a valve for controlling flow through a pipe or conduit.
Figure 2:
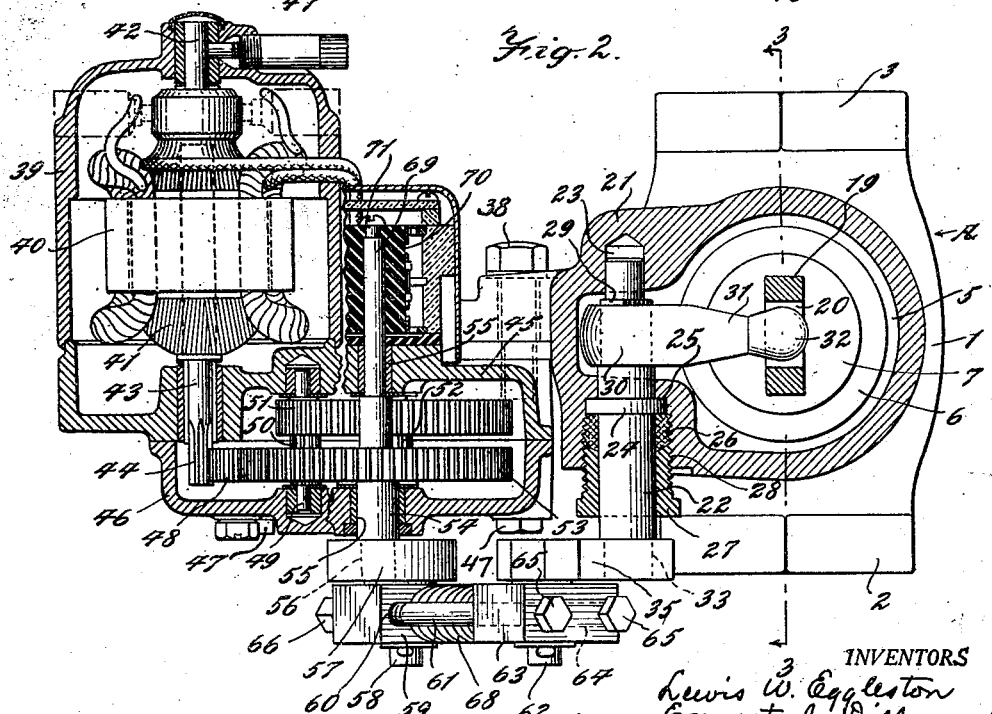
Fig. 2 is a section on the line 2—2 of Fig. 1.

Referring to the drawings by characters of reference, A designates, by way of example, a device to which our improved motor drive is adapted to be applied, or in combination with which the same is adapted to be used. This device A is shown in the preferred form and by way of example, as consisting of a valve structure, the same including a valve body 1, having interiorly threaded nipples 2, 3, arranged in axial alinement, and adapted to be connected in a pipe or conduit, and constituting the inlet and outlet to the interior of the valve body. The valve body is provided with an interior cross-diaphragm or wall 4, which separates the ports through the nipples 2, 3, and is provided with a horizontal portion 5, into which is threaded an annular valve seat 6. Cooperating with the valve seat is a disk valve 7 carried by a reciprocable valve stem 8, the upper end of which is provided with a head 9 slidably arranged within a guide opening 10 in a cap 11, constituting a closure for the upper portion of the valve body. The cap 11 may be threaded into the valve body, as at 12, or applied thereto in any other suitable manner. Attached to the lower portion of the valve disk is a lower guide plunger or stem 13, in longitudinal axial alinement with the stem 8, and having at its lower end a cylindrical head 14 slidably disposed within the bore 15 of a boss 16, preferably formed integral with the lower end of the valve body. The wall of the boss 16 may be provided with a port 17 communicating with the interior of the valve body, so that any fluid which may enter the bore 15 below the plunger head 14, will be relieved by flowing out through the port 17 upon descent of the valve, so that the fluid will not interfere with the proper seating of the valve on its seat 6. If desired, the bore 15 may extend entirely through the lower portion of the valve body and be closed by a threaded plug 18, to permit cleaning of the bore 15. The stem 8 is provided at a point above the valve disk 7 with an enlargement 19, which is formed with an opening 20 to receive operating means for raising and lowering the valve to open and close the latter, which will now be described:

The valve body is provided at one side with a hollow chambered enlargement 21, communicating with the interior of the valve body above the valve seat. Extending from an external point through the wall of the body and across the interior of the enlargement 21, is an operating rock shaft 22, the inner end of which is seated in a socket bearing 23 in the wall of said enlargement, and the outer end portion of which is provided with a collar 24 seated against a shoulder 25 on the body (see Fig. 2), and held thereagainst by suitable packing 26 and packing nut or gland 27 surrounding said shaft, and threaded into the wall of the valve body, as at 28. The arrangement is such that the shaft may oscillate or rock in its bearings, but leakage past the same from the interior of the valve body is prevented. Within the chamber of the enlargement 21 the shaft is provided with a polyfaced or squared portion 29, over which is tightly fitted a correspondingly formed opening in a head 30 on the outer end of a valve-operating lever 31, the inner end of which is provided with a rounded head 32 projecting into the opening 20 heretofore described, and adapted to engage the upper and lower walls of the latter, so that when the shaft is rocked the valve may be moved toward and from its seat. The outer end of the shaft 22 is provided with a squared portion 33, upon which is clamped and rigidly secured one end 34 of a connecting lever 35, which constitutes a preferred means for transmitting motion from the motor drive to the valve, in order to open and close the same.

We will now describe our improved motor drive and the connections between the same and the valve for operating the latter. The valve body is provided with upper and lower bracket arms 36, 37, which are secured rigidly and detachably by means of bolts 38 to the casing 39 of a suitable rotary electric motor to which current may be supplied from any suitable source, as will be hereinafter described. The motor is of the type adapted to rotate in one direction, and includes the usual field magnets 40 and armature 41, the latter being mounted upon an armature shaft 42, one end 43 of which projects through one side wall of the motor casing, and is provided at its outer end with a pinion 44. The pinion 44 serves to transmit motion from the motor armature to a suitable train of gearing mounted within a gear housing 45 formed in part of the motor casing, and by a cap or closure plate 46 secured to and spaced from the motor housing, said cap plate 46 being secured to the motor housing by suitable screw bolts 47. The gear transmission just mentioned, preferably comprises a gear 48 meshing with the pinion 44 heretofore described, and having suitable bearings 49 carried by the motor housing and the plate 46. The shaft of the gear 48 carries a smaller pinion 50, which meshes with a larger gear 51, also having suitable bearings in the casing and carrying a pinion 52 which meshes with a larger gear 53 mounted on a shaft 54 turning in bearings 55 located in the opposite walls of the gear housing (see Fig. 2). The motor is adapted when driven to turn continuously in one direction, and, therefore, when energized serves to drive the gear 53, which constitutes the end gear of the transmission train.

The outer end of the shaft 54 is provided with a squared portion 56, upon which is eccentrically mounted a crank disk 57 carrying a crank pin 58, which is rotatably mounted in a cross-head or yoke 59, preferably made of a block of bakelite or other material providing for electric and heat insulation. The crank piece 57 may be rigidly secured in position by any suitable means, for example, by a set screw 57ª. The cross-head or yoke 59 is provided with transverse guide openings 60 to slidably receive connecting rods 61, preferably in the form of bolts arranged parallel to each other, as shown in Fig. 1, and extending in a plane at right angles to the axis of rotation of the shaft 54 and the eccentric disk 57. On the outer end of the lever 35 is rigidly secured a crank pin 62, which turns within a cross-head or yoke 63 of construction similar to the cross-head 59, and also made of bakelite or other suitable electric and heat insulating material. The cross-head 63 is also provided with guide openings, as at 64, to receive the ends of the connecting rods or bolts 61, the latter being provided on the outer side of said yoke 63 with stop heads 65, which may be integral with said rods, and the ends of said bolts which project through the cross-head 59 may be provided with adjustable stops, preferably in the form of nuts 66 threaded on the ends of said rods. The yokes are provided on their inner faces with stops 67, 67ª, which are adapted to cooperate to limit movement of the yokes or cross-heads toward each other, and to transmit motion in a manner to be presently described. The stops 67, 67ª are preferably in the form of pins, and surrounding and supported by the same is arranged a compression spring 68, the same being held in position by said pins, and the outer ends of which are seated against the inner or adjacent faces of the yokes or crossheads.

From the foregoing description, it will be seen that when the motor is energized from a suitable switch or circuit-controlling means, the shaft 54 will be turned counter-clockwise, which will cause the yoke 59 to engage the adjustable stops 66 to pull the stop heads 65 into engagement with the yoke 63, whereby the lever 35 will be pulled to the left of Fig. 1 to raise the valve stem 8 and lift the valve 7 from its seat, this motion continuing until the motor comes to rest, as controlled by the controlling device to be presently described, the parts then assuming substantially the position indicated in dotted lines in Fig. 1, in which position the crank pin 58 will be on the opposite side of the shaft 54 from the position shown in full lines in Fig. 1. In the position just described, the valve will be held in open position until the motor is again energized to rotate the shaft 54. When the motor is again energized, the cross-head or yoke 59 will first exert its force upon the spring 68, which in turn transmits movement to the cross-head 63 to throw the lever 35 toward the right to the position shown in Fig. 1, thereby moving the valve 7 to closed position and holding it closed when the motor again comes to rest. During this motion the bolt heads 65 move away from the outer face of the yoke 63 to substantially the position shown in Fig. 1, so that there is a lost motion or cushioning action in the seating of the valve. By this arrangement it is assured that the valve will be properly seated before the motor comes to rest, and without resulting in strain on the parts. The yielding connection also obviates the provision of complicated adjustments which would otherwise be required. If during this movement the spring should not be sufficiently compressed to exert enough tension to seat the valve, due to the latter sticking in open position, or otherwise resisting closing movement, the lower stop pin 67 strikes the upper pin 67$^a$ so that power is exerted positively on the yoke 63 and the lever 35 to throw the valve to closed position. By this arrangement it will be seen that a lost motion or cushioning action is provided to protect the parts when the valve reaches its seat, but in the event the valve sticks, the pins 67, 67$^a$ provide for positive operation. In the preferred embodiment, the spring 68 is made stiff enough so as not to compress appreciably until the valve is actually seated, and to then be compressed, thereby holding the valve to its seat.

The above operation may be assured by various controls within the spirit and scope of our invention, but we prefer to employ a circuit control, which will now be described:

The shaft 54 is provided with an extension 69 projecting through the rear wall of the gear housing and turning in the bearing 55 heretofore described. On the end of said continuation 69 is a rotary contact carrier 70, made of any suitable insulating material and secured to said continuation 69 by a clamping screw 71. The contact carrier 70 carries a metallic conductor plate 72 provided with a plurality of flexible metallic fingers 73$^a$, 73$^b$ and 73$^c$ extending parallel to and spaced from each other, as shown, and constituting wiping contact members. The end fingers 73$^a$, 73$^c$ may be integral with the plate 72, but the finger 73$^b$ is hinged to the plate as at 74, and is urged outward by an expansion spring 75 seated in a socket in the member 70. Surrounding the shaft and located against the wall of the housing is a plate of insulating material 75$^a$, and clamped against the same by means of an outer plate 76 and apertured plate 77, also of insulating material, and secured in place by means of screws 77$^a$, is an intermediate or spacing block 78 of insulating material, having an internal circular opening 79. In the bore of the block 78 are circumferential end grooves 80 and a central groove 81 formed by spacer sleeves 80$^a$ of insulation. In the inner end groove 80 is a continuous annular contact 82, while in the outer end groove are semi-circular contacts 83, 84, arranged with end gaps or spaces 85, 86, and in the center groove 81 are segmental contacts 87, 88 which respectively bridge the spaces 85, 86. The contacts 87, 88 are formed with inclined approaching surfaces 89 and with abrupt ends or terminals 90. These contacts are of general circular contour on their inner faces and lie in parallel planes to each other. The fixed contact 82 is provided with an extension lug 82$^a$, the contacts 83, 84 with lugs 83$^a$, 84$^a$, and the contacts 87, 88 with lugs 87$^a$, 88$^a$, respectively, and the block 78 is made up preferably of sections so that when the screws 77$^a$ are tightened the sleeves 80$^a$ will clamp the rings in the grooves 80, 81, by means of which lugs the wiring or circuit connections may be established in order to control the supply of current to the driving motor. These circuit connections will now be described, it being first premised that the circuit may be made and broken by any suitable switching device, preferably, for example, a tilting mercury switch (see Fig. 7), comprising a sealed glass container 91 having at its opposite ends internal pairs of contacts 92, 93, and containing a body of mercury 94, which when the container is tilted will move from one end to the other of the latter to break the circuit at one pair of contacts, and establish a circuit at the other pair of contacts. In the present embodiment, the inner contacts of each pair are connected by a conductor 95.

In Fig. 7 the motor heretofore described is indicated generally at M, the negative lead being at 96 and the positive lead at 97, these leads deriving current from a suitable source, indicated by the legend "Line". The lead 97 from the line leads to the lug 82$^a$ on the contact ring 82. The lug 87$^a$ on the intermediate contact 87 is connected by a conductor 98 with the lug 88$^a$, intermediate contact 88, said conductor 98 and contact 88, being connected by lead 99 to the motor. The contact lug 87$^a$ is connected by a conductor 100 to the connection 95 heretofore described. The lug 83$^a$ on contact strip 83 is connected by a conductor 101 to the end contact of the pair of tube contacts 92, and the end contact 84 is connected by a conductor 102 to the end contact of the pair of contacts 93. When the tube 91 is tilted to the position shown in Fig. 7, so that the mercury 94 will establish the circuit at the contacts 92 in the tube, current will flow to the motor in the following manner, it being understood that the parts are in the relative position of rest shown in Fig 7: The current from the plus lead 97 flows by way of the ring 82 to the contact 73$^c$, and thence through the plate 72, the wiping contact 73$^a$ to the contact 83. From contact 83 the current passes by lead 101 to the end contact 92 in the tube, through the mercury and the inner contact 92, the leads 95, 100, 98 and 99 to the motor and thence to the negative lead 96 to the line. No current flow can take place at this time through the contacts 84, 87, 88, because they are separated and insulated from each other, and no flow takes place through the contact 73$^b$, because it is out of electrical connection with contacts 87 and 88. The current thus supplied the motor will start the same to rotate, which will cause rotation of shaft part 69 carrying the outer contacts 73$^a$ and 73$^c$ along the contacts 82 and 83, and eventually bringing the intermediate wiping contact 73$^b$ into contact with the shorter intermediate fixed contact 88. As soon as the intermediate contact 73$^b$ reaches the intermediate contact 88, the flow through the circuit-making and breaking tube contacts 92 is short-circuited, and the circuit is then as follows: Through lead 97 to the contact ring 82, thence to contact 73$^c$, plate 72, intermediate wiping contact 73$^b$, intermediate fixed contact 88 to the lead 99 to the motor. The motor will then continue to operate to move the valve to open position, the rotation continuing until the wiping contact 73$^b$ snaps from the end of the fixed contact 88, whereupon the circuit will be broken sharply. It will be noted that contact 73$^a$ breaks contact at gap 86 while the contact 73$^b$ is still travelling on contact 88, so that the circuit is broken at 83, but continues through 82, 73$^c$, 73$^b$ and 88. By this arrangement it will be seen that if the circuit be established at the tube switch contacts 92, and held long enough to result in the intermediate wiping contact 73$^b$ reaching the intermediate fixed contact 88, the motor will be run continuously until the valve is moved to full open position, but if the tube be trifled with so as to cause a quick or instantaneous make and break at the contacts 92 insufficient to cause the motor to rotate the wiping contact 73$^b$ to reach the contact 88, the motor will not have been energized sufficiently to operate the valve.

When the wiping contacts on plate 72 have been moved from the initial position, or position of rest, with relation to the fixed contacts, 82, 83 as just described, to a position corresponding to that shown in Fig. 7 but with the contacts on plate 72 on the upper contacts 82, 84, the device is then set or in position to respond to a further supply of current to shut the valve should the tube 91 be tilted to flow the mercury out of contact with the contacts 92 into contact with the contacts 93, to establish the circuit therethrough. When the tube is so tilted, the circuit is as follows: The current flows by lead 97 to the fixed contact ring 82. From contact 82 the flow is by way of the wiping contact 73$^c$, plate 72 and wiping contact 73$^a$, to the fixed contact 84, whence the flow is by way of the lead 102 to the outer end contact 93 in the tilting tube, through the mercury and the inner contact 93, lead 95, connection 100, conductor 98, lead 99 to the motor, and by the negative lead 96 to the line. As soon as the motor has run long enough to bring the intermediate contact 73$^b$ on the intermediate contact 87, the flow through the contacts 93 is short-circuited, in the same manner as previously described with reference to the contacts 92, and the flow is then as follows: lead 97, contact 82, contacts 73$^c$, 73$^b$, intermediate fixed contact 87, leads 98 and 99 to the motor, and from the motor through the conductor 96 to the line until contact 73$^b$ snaps from the end 90 of contact 87. The same advantages are present during this cycle or period of rotation as heretofore described. By provision of the abrupt ends 90 on the contacts 87 and 88 and the spring contact 73$^b$, the circuit is broken sharply with a snap movement, thus enabling operation of the motor by high voltage current.

While we have shown the primary controlling switch as consisting, preferably, of a tilting mercury contact device, we only do so by way of example, as it will be understood that in place of the pairs of contacts 92, 93, we may employ a double throw switch (not shown) operated by hand to establish contact at pairs of terminals corresponding to the pairs 92, 93. The mercury tube control, however, has advantage, in that it may be operated automatically, for example, by thermostatic or pressure-controlled devices, not shown, which are available for the purpose. The system of circuit control described is of special advantage in connection with a tilting switch of the character disclosed, for the reason that should anyone tilt the switch to establish a short or instantaneous circuit through the tilting switch, for a period not long enough to carry the rotary switch device far enough to short-circuit the tube, the circuit to the motor will not be closed for a period long enough to permit an incomplete operation of the valve, which is not desired. On the other hand, if the circuit at the tube is closed long enough to cause the intermediate contact 73$^b$ to reach either of the contacts 87 or 88, the tube will be short-circuited and a continuous flow of current will pass to the motor, thus assuring a complete operation of the valve either toward open or closed position, as the case may be. In other words, the arrangement assures that any operation, either intentional or otherwise, which closes the circuit at the tube contacts long enough to cause the rotary contact maker to reach either of the intermediate contacts 87 or 88, will result in a complete operation of the mechanism. It will be understood that the parts of the contact-making device are so arranged with relation to the mechanism controlled, that the circuit will be broken at the proper point to assure the motor coming to rest when the valve reaches either full open or full closed position. In the present embodiment the control brings the motor to rest when the connecting or transmitting devices between the motor and valve are in the positions shown in full and dotted lines, respectively, in Fig. 1.

What we claim and desire to secure by Letters Patent of the United States is:—

1. A device of the character described comprising a valve body having a valve seat, a valve movable toward and away from said seat to control flow through said body, a lever for moving the valve, an electric motor rotatable in one direction, a crank rotated by said motor, a connection between said crank and said lever, said connection including yieldable means for transmitting motion from said motor to said lever to close the valve, positive means for transmitting motion from said motor to said lever to open the valve, and means comprising alined normally spaced pins acting positively to operate the lever to close the valve when said yieldable means has yielded to a determined degree.

2. A device of the character described comprising a valve body having a valve seat, a valve movable toward and away from said seat to control the flow through said body, a lever for moving the valve, a device pivoted on said lever, an electric motor rotatable in one direction, a crank rotated by said motor, a device pivoted on said crank, compressible means between said devices and yieldingly acting on the lever to push the lever in one direction to close the valve, and a connection between said devices acting to positively pull the lever in the other diretion to move the valve toward open position.

3. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, compressible means between said devices and yieldingly acting on the lever to close the valve, means acting positively to actuate said lever after said compressible means has yielded to a determined degree, and a connection between said devices acting to positively operate said lever to move the valve toward open position.

4. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, compressible means between said devices and yieldingly acting on the lever to close the valve, means acting positively to actuate said lever after said compressible means has yielded to a determined degree, and a connection slidably engaging said devices during closing movement of the valve and having means to positively connect the devices to operate said lever to move the valve toward open position.

5. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, compressible means between said devices and yieldingly acting on the lever to close the valve, cooperating stops on said devices acting positively to actuate said lever after said compressible means has yielded to a determined degree, and a connection between said devices acting to positively operate said lever to move the valve toward open position.

6. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, compressible means between said devices and yieldingly acting on the lever to close the valve, cooperating stops on said devices acting positively to actuate said lever after said compressible means has yielded to a determined degree, said stops supporting said compressible means, and a connection between said devices acting to positively operate said lever to move the valve toward open position.

7. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, parallel rods connecting said devices and slidably engaging one of the same, and compressible means between said devices and yieldingly acting on the lever to close the valve.

8. A device of the character described comprising a valve body having a valve seat, a valve movable toward and away from said seat to control flow through said body, a lever for moving the valve, a device pivoted on said lever, an electric motor rotatable in one direction, a crank rotated by said motor, a device pivoted on said crank, parallel rods connecting said devices and slidably engaging one of the same, compressible means between said devices and yieldingly acting on the lever to close the valve, and cooperating stops on said devices acting positively to actuate said lever after said compressible means has yielded to a determined degree.

9. A device of the character described comprising a valve body having a valve seat, a valve movable toward and away from said seat to control flow through said body, a lever for moving the valve, device pivoted on said lever, an electric motor rotatable in one direction, a crank rotated by said motor, a device pivoted on said crank, parallel rods connecting said devices and slidably engaging one of the same, a spring between said devices and yieldingly acting on the lever to close the valve, and cooperating stop pins on said devices acting to engage each other to positively actuate said lever after said compressible means has yielded to a determined degree, said stop pins constituting supports for said spring.

10. In a device of the character described, a device adapted to be operated intermittently, an electric motor rotatable in one direction, gearing for transmitting motion from said motor to said device, and controlling means for said motor including a motor-energizing circuit, a primary double pole switch for opening and closing said circuit, and a current-maintaining switch controlling said circuit and including an annular fixed contact, opposite semi-circular fixed contacts having end gaps, opposite segmental fixed contacts laterally spaced from and bridging the gaps between said semi-circular contacts, rotary contacts driven by said motor and cooperable with said fixed contacts to cause predetermined rotation of said motor, and means whereby the rotary contact for said segmental contacts will break circuit therewith with a snap action to terminate rotation of said motor.

11. A device of the character described comprising a valve body having a port, a valve movable toward and away from said port to control flow therethrough, a rockable member for moving the valve, an electric motor rotatable in one direction and adapted to actuate said member, a yieldable lost motion connection between said motor and member, and controlling means for said motor including a motor-energizing circuit, a primary double pole switch for opening and closing said circuit, and a current-maintaining switch controlling said circuit and including an annular fixed contact, opposite semi-circular fixed contacts having end gaps, opposite segmental fixed contacts laterally spaced from and bridging the gaps between said semi-circular contacts, rotary contacts driven by said motor and cooperable with said fixed contacts to cause predetermined rotation of said motor, and means whereby the rotary contact for said segmental contacts will break circuit therewith with a snap action to terminate rotation of said motor.

12. A device of the character described, comprising a valve body having a bonnet, oppositely disposed guide means in said body and bonnet, said body having a valve port, a valve reciprocable in said body and having means cooperable with said guide means for guided movement toward and from said port, a rock shaft projecting through and journaled in said body, a lever fixed on said shaft within said body and operatively connected to said valve to reciprocate said valve, a second lever fixed on said shaft outside said body, a device journaled on said second lever, motor means having a crank, a device journaled on said crank, resilient means between said devices to transmit the force of said motor means to said valve, and means between said devices to exert a positive direct force from said motor means to said valve to open said valve.

13. A device of the character described, comprising a valve body having a bonnet, oppositely disposed guide means in said body and bonnet, said body having a valve port, a valve reciprocable in said body and having means cooperable with said guide means for guided movement toward and from said port, a rock shaft projecting through and journaled in said body, a lever fixed on said shaft within said body and operatively connected to said valve to reciprocate said valve, a second lever fixed on said shaft outside said body, a device journaled on said second lever, motor means having a crank, a device journaled on said crank, resilient means between said devices to transmit the force of said motor means to said valve, means between said devices to exert a positive direct force from said motor means to said valve to open said valve, and means actuated by said motor means to control said motor means to stop the same when said valve has opened or closed said port.

14. A device of the character described, comprising a valve body having a valve port, a valve in said body movable toward and away from said port to control flow through said body, said body having bracket arms, a motor casing rigidly secured to said arms, a gear housing formed in part by said motor casing, a cap plate closing said housing and secured to said motor casing, motor drive means in said motor casing, and a train of gearing in said gear housing, said gearing having operative connection with said motor means and with said valve whereby said motor means is operable to move said valve.

15. A device of the character described, comprising a valve body having a valve port, a valve in said body movable toward and away from said port to control flow through said body, said body having bracket arms, a motor casing rigidly secured to said arms, a gear housing formed in part by said motor casing, a cap plate closing said housing and secured to said motor casing, motor drive means in said motor casing, a train of gearing in said gear housing, said gearing having operative connection with said motor means, and means connecting said gearing and said valve for yieldable movement of said valve toward said port and for positive movement of said valve away from said port.

In witness whereof we have hereunto signed our names.

LEWIS W. EGGLESTON.
EARNEST J. DILLMAN.